United States Patent
Rosenholm (10) Patent No.: US 11,828,131 B1
(45) Date of Patent: Nov. 28, 2023

(54) DOWNHOLE PLUG WITH INTEGRATED SLIP COVER AND EXPANSION ELEMENT

(71) Applicant: Workover Solutions, Inc., Imperial, PA (US)

(72) Inventor: Carl Andrew Rosenholm, Sugar Land, TX (US)

(73) Assignee: Workover Solutions, Inc., Imperial, PA (US)

( * ) Notice: Subject to any disclaimer, the term of this patent is extended or adjusted under 35 U.S.C. 154(b) by 176 days.

(21) Appl. No.: 17/196,450

(22) Filed: Mar. 9, 2021

Related U.S. Application Data (60) Provisional application No. 62/987,160, filed on Mar. 9, 2020.

(51) Int. Cl.
| | |
|---|---|
| *E21B 33/12* | (2006.01) |
| *B29C 45/14* | (2006.01) |
| *B29K 75/00* | (2006.01) |
| *B29K 29/00* | (2006.01) |
| *B29L 31/26* | (2006.01) |

(52) U.S. Cl.
CPC .... *E21B 33/1208* (2013.01); *B29C 45/14336* (2013.01); *B29K 2029/04* (2013.01); *B29K 2075/00* (2013.01); *B29K 2995/0059* (2013.01); *B29L 2031/265* (2013.01); *E21B 2200/08* (2020.05)

(58) Field of Classification Search
CPC . E21B 33/1208; E21B 2200/08; E21B 33/129
See application file for complete search history.

(56) References Cited

U.S. PATENT DOCUMENTS

| | | | | |
|---|---|---|---|---|
| 2,225,143 | A | * | 12/1940 | Baker ................... E21B 33/128 |
| | | | | 166/134 |
| 2,970,649 | A | * | 2/1961 | Brown ................ E21B 33/1265 |
| | | | | 166/134 |
| 3,085,627 | A | * | 4/1963 | Sodich ................ E21B 33/1208 |
| | | | | 166/212 |
| 3,997,489 | A | | 12/1976 | Coker |
| 4,411,800 | A | | 10/1983 | Green et al. |
| 5,542,473 | A | * | 8/1996 | Pringle ................. E21B 33/129 |
| | | | | 166/134 |
| 6,350,518 | B1 | | 2/2002 | Schertz et al. |
| 8,757,260 | B2 | | 6/2014 | Luo et al. |
| 10,174,578 | B2 | | 1/2019 | Walton et al. |
| 10,208,559 | B2 | | 2/2019 | Takahashi et al. |
| 10,227,841 | B2 | | 3/2019 | Fripp et al. |
| 10,260,309 | B2 | | 4/2019 | Fripp et al. |
| 10,308,807 | B2 | | 6/2019 | Sherman et al. |

(Continued)

OTHER PUBLICATIONS

Complet Composite Pellets Material Processing Guide, PlastiComp, Inc., created Apr. 8, 2014, retrieved on Jul. 28, 2015, 10 pages, retrieved from <http://www.plasticomp.com/wp-content/uploads/PlastiComp-Material-Processing-Guide.pdf>.

(Continued)

*Primary Examiner* — Theodore N Yao
(74) *Attorney, Agent, or Firm* — Jones Walker LLP (57) ABSTRACT

Tools for sealing a tubing in a downhole environment. The tools feature top and bottom slip assemblies and a monolithic sealing element. The monolithic sealing element includes a portion that is disposed between the top and bottom slip assemblies as well as portions that encapsulate the slip assemblies. When the tool is actuated from a run-in configuration to a set configuration, the slips move toward each other squeezing the sealing element so that it forms a fluid-tight seal with the tubing. Teeth of the slip assemblies penetrate the portions of the sealing element disposed thereon and bite into the tubing.

16 Claims, 7 Drawing Sheets

(56) References Cited

U.S. PATENT DOCUMENTS

| | | | |
|---|---|---|---|
| 2007/0051510 A1 | 3/2007 | Veneruso et al. | |
| 2007/0267824 A1* | 11/2007 | Baugh | E21B 23/01 277/603 |
| 2009/0242214 A1* | 10/2009 | Foster | E21B 23/01 166/387 |
| 2012/0073834 A1* | 3/2012 | Lembcke | E21B 33/1216 166/387 |
| 2012/0181032 A1 | 7/2012 | Naedler et al. | |
| 2012/0214715 A1 | 8/2012 | Luo et al. | |
| 2014/0083717 A1 | 3/2014 | Frazier et al. | |
| 2014/0110112 A1 | 4/2014 | Jordan, Jr. | |
| 2014/0116711 A1 | 5/2014 | Tang | |
| 2014/0190685 A1 | 7/2014 | Frazier et al. | |
| 2014/0238700 A1 | 8/2014 | Williamson | |
| 2015/0129239 A1 | 5/2015 | Richard | |
| 2015/0144348 A1 | 5/2015 | Okura et al. | |
| 2015/0299516 A1 | 10/2015 | Tran | |
| 2015/0354311 A1 | 12/2015 | Okura et al. | |
| 2016/0061000 A1* | 3/2016 | Rochen | E21B 33/1216 166/138 |
| 2016/0230498 A1 | 8/2016 | Walton et al. | |
| 2018/0016662 A1 | 1/2018 | Qin et al. | |
| 2018/0171746 A1 | 6/2018 | Dudzinski et al. | |
| 2020/0123873 A1* | 4/2020 | Sherman | E21B 33/1208 |
| 2020/0149366 A1* | 5/2020 | Kellner | E21B 29/02 |
| 2020/0347694 A1* | 11/2020 | Power | E21B 33/1293 |

OTHER PUBLICATIONS

Degradable Composite Polymer Information Sheet, Bubbletight, LLC, created Apr. 30, 2015, 2 pages, retrieved from <bubbletightusa.com>.

Fink, Johannes, "Petroleum Engineer's Guide to Oil Field Chemicals and Fluids," $2^{nd}$ Edition, 2012, Elsevier, p. 88.

Material Safety Data Sheet for Mowiflex TC-232 (now Mowiflex C-30), Kuraray America Inc., issued on Oct. 4, 2011, revised on Mar. 6, 2014, 7 pages, retrieved from <http://www.desktop3dprinter.com/user/pdf/Material%20Data%20Sheets/Leapfrog%20PVA%20data%20sheet.pdf>.

Material Safety Data Sheet for Mowiflex TC-253 (now Mowiflex C-17), Kuraray America Inc., issued on Oct. 4, 2011, revised on Mar. 6, 2014, 7 pages, retrieved from <http://www.kuraray.eu/fileadmin/Downloads/Mowiflex/tc_253/2014/MowiflexTC_253-CPH_MSDS_NA-English.pdf>.

Mowiflex Fracking Balls Information Sheet, Kuraray America Inc., Aug. 2016, 2 pages, retrieved from <http://www.kuraray.eu/fileadmin/produkte_und_maerkte/MOWIFLEX/mowiflex_fracking_balls_06082015_web.pdf>.

Mowiflex General Information Sheet, Kuraray America Inc., Aug. 2016, 4 pages, retrieved from <http://www.kuraray.eu/fileadmin/produkte_und_maerkte/MOWIFLEX/mowiflex_general_information_06082015_web.pdf>.

Saxena, S.K., "Polyvinyl Alcohol (PVA)," Chemical and Technical Assessment, 61st JECFA, FAO, Nov. 11, 2004, 3 pages.

Technical Data Sheet for Mowiflex C-17, Kuraray America Inc., retrieved on Aug. 25, 2015, 2 pages, retrieved from <http://www.kuraray.eu/fileadmin/Downloads/Mowiflex/technical_data_sheets/TDS_C_17.pdf>.

Technical Data Sheet for Mowiflex C-30, Kuraray America Inc., retrieved on Aug. 25, 2015, 2 pages, retrieved from <http://www.kuraray.eu/fileadmin/Downloads/Mowiflex/technical_data_sheets/TDS_C_30.pdf>.

* cited by examiner

DOWNHOLE PLUG WITH INTEGRATED SLIP COVER AND EXPANSION ELEMENT

CROSS REFERENCE TO RELATED APPLICATIONS

This is a non-provisional of U.S. Provisional Patent Application Ser. No. 62/987,160, filed Mar. 9, 2020, which is incorporated herein by reference in its entirety, and to which priority is claimed.

FIELD OF THE INVENTION

This application relates to the field of downhole tools and equipment and methods of manufacturing such tools and equipment. More particularly, the application relates to downhole plugs, such as bridge and/or fracking plugs, that are useable in downhole operations.

BACKGROUND

Recent advancements in hydrocarbon recovery techniques have enabled the production of hydrocarbons from reservoirs that could not be produced economically without the use of such techniques. In particular, hydraulic fracturing (or "fracking") involves the injection of a high pressure fluid (primarily water, proppants, and other job-specific compounds) to fracture a portion of a hydrocarbon-containing formation such that the desired hydrocarbons may be more easily recovered. Typically, multiple zones of a formation are independently isolated and fractured.

Figure 1:
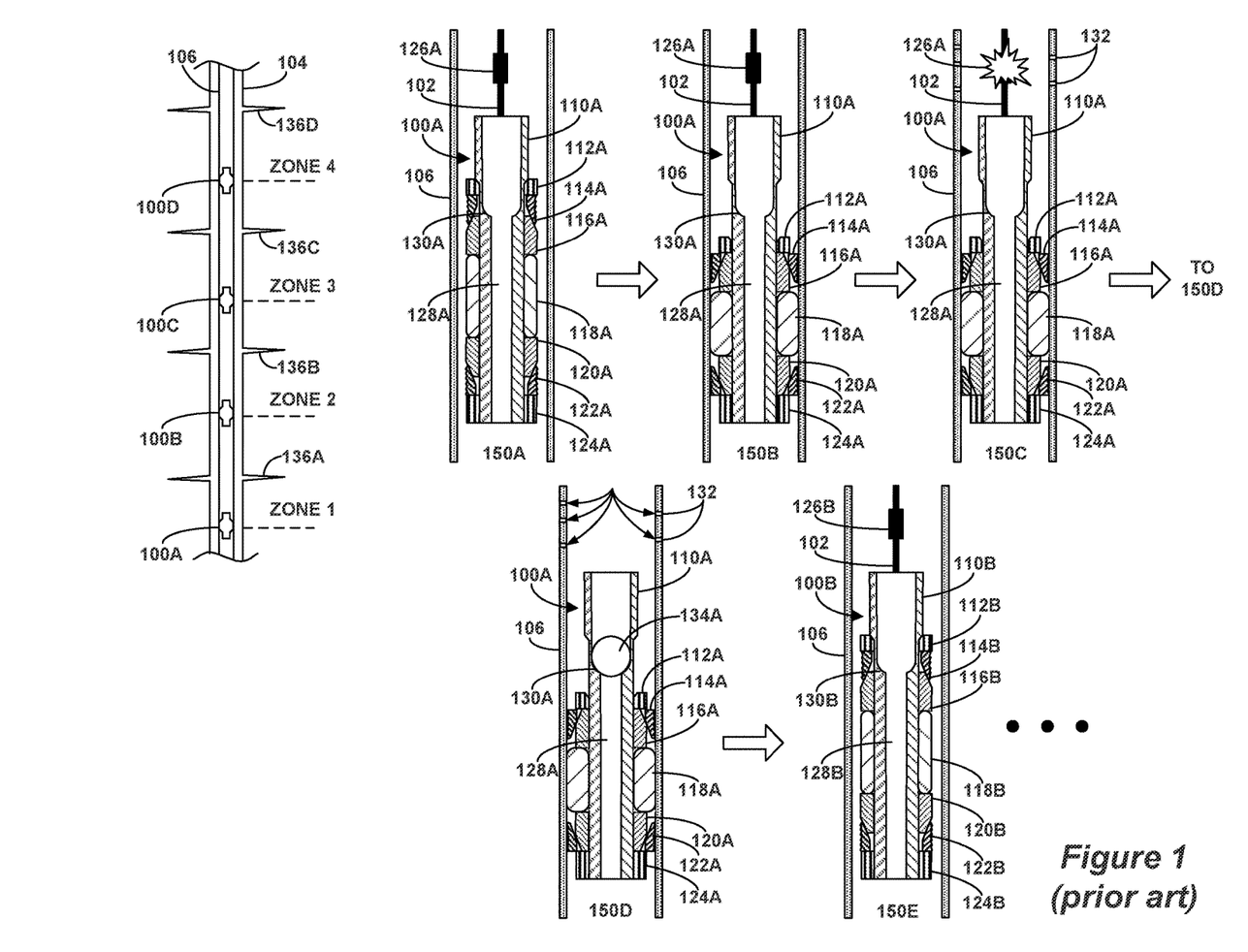
FIG. 1 is a diagram illustrating the steps of a plug and perf hydraulic fracturing operation.

One common technique for isolating and fracturing different zones in a formation involves a process known as "plug-and-perf," which process is illustrated in FIG. 1. This process may be utilized with various different arrangements of hydrocarbon production conduits. For example, conduit 106 may be production casing that is cemented into wellbore 104, a liner that is cemented in wellbore 104, or a liner that is situated within an open wellbore 104 (perhaps with swell packers isolating the annuli between the various zones). The plug-and-perf process can also be utilized with other production conduit arrangements, as is known by those of ordinary skill in the art.

The plug-and-perf process begins by isolating the zone for which hydraulic fracturing is to be performed from lower zones in the wellbore 104. This is accomplished by lowering a plug 100 into the well. In the example illustrated in FIG. 1, plug 100A is lowered to a desired location within the production conduit 106 from the surface of the well via a conveying apparatus 102 such as wireline, slickline, or coiled tubing (step 150A). It should be noted that the example illustrated in FIG. 1 assumes that a zone downhole (as used herein the terms "downhole" and "uphole" refer to locations that are further from and closer to the surface of a well, respectively) from ZONE 1 is to be isolated from the hydraulic fracturing operation performed in ZONE 1.

The plug 100A is then mechanically actuated (e.g., using a setting tool) to cause the plug to engage the production conduit 106 and isolate the portion of the production conduit 106 below the plug 100A from the portion of the production conduit 106 above the plug 100A (step 150B). In the illustrated example, the plug 100A is set by driving the shoulder 112A, which is disposed circumferentially about a mandrel 110A, toward a lower end of the plug 100A. As the shoulder 112A is forced downward, the cone 120A is driven behind the slips 122A causing the slips 122A to move radially outward from the plug 100A. The slips 122A include teeth that engage the interior wall of the production conduit 106 to prevent downward movement of the plug 100A. In addition, the sealing member 118A, which is constructed from an elastomeric material such as nitrile rubber, becomes deformed and contacts the interior wall of the production conduit 106 to form a fluid tight seal between the mandrel 110A and the interior wall of the production conduit 106. As the shoulder 112A continues to be forced downward, the cone 116A is driven under the slips 114A causing the slips 114A to move radially outward from the plug 100A. The slips 114A include teeth that engage the interior wall of the production conduit 106 to prevent upward movement of the plug 100A. Many plugs include mechanical devices (e.g., shear pins, etc.) that ensure that actuation of the various components of the plug occurs in a desired order (e.g., actuation of bottom slips 122A followed by deformation of sealing member 118A followed by actuation of top slips 114A, etc.). When the plug 100A has been fully actuated, its position is maintained within the production conduit 106 by the friction force between the slips 114A, 122A and the production conduit 106 and the fluid pathway outside of the plug 100A is sealed by the sealing member 118A. Thus, the only fluid path from above the plug 100A to below the plug 100A is through the plug bore 128A. While a general plug design has been shown for purposes of illustration, it will be understood that numerous other plug designs are employed to accomplish the same task.

After the plug 100A has been set, the production conduit 106 is perforated to create a fluid pathway between the hydrocarbon-containing formation and the interior of the production conduit 106 (step 150C). The perforations 132 penetrate through the production conduit 106 and typically extend at least some distance into the formation. Typically, perforations 132 are formed using a perforation gun 126A (shown only symbolically in the example of FIG. 1). A perforation gun 126A includes shape charges that, upon ignition (e.g., from the surface via a wireline), produce a jet of high pressure, high velocity gas that penetrates into the formation. In plug-and-perf operations, it is common for the perforation gun 126A to be conveyed into the production conduit 106 on the same conveying apparatus 102 that is used to convey the plug 100A, although this is not strictly necessary.

After the production conduit has been perforated above the plug 100A, the conveying apparatus 102 and the perforating gun 126A are removed from the well. In order to isolate the portion of the production conduit 106 above the plug 100A from the portion below, a frac ball 134 is conveyed down the production conduit 106 in a fracture fluid (the frac ball having a slightly greater density than the fracture fluid) until it comes to rest on the ball seat 130 of the plug 100A (step 150D). The ball seat 130A is complementary to the ball 134A, which allows the ball 134A to form a seal that prevents fluid from flowing downward through the bore 128A. The fracture fluid flows into the formation through the perforations 132, and, as the pressure of the fracture fluid is increased (often to pressures of 10,000 psi or greater), fractures 136A are formed in the formation in ZONE 1. Proppants in the fracture fluid hold the fractures 136A open even after the fracture fluid is removed from the well, which enables hydrocarbons in the formation to be extracted more efficiently. It should be noted that the plug 100A is exposed to the extreme pressures required to generate the fractures 136A and therefore its components (including the ball 134A) must maintain their mechanical integrity when exposed to such pressures in order to maintain the isolation of the production conduit 106 to ensure that the fracturing operation is focused on the intended zone.

After ZONE 1 has been fractured (i.e., fractures 136A have been formed), plug 100B is conveyed into the production conduit 106 on the conveying apparatus 102 to a desired location between the surface and the fractures 136A (step 150E). The process of plugging, perforating, and fracturing is then repeated to isolate and fracture each zone, moving in an uphole direction. When all of the zones have been fractured, the plugs must be milled, drilled out, or dissolved to enable hydrocarbons to flow to the surface of the well through the production conduit.

Figure 2:
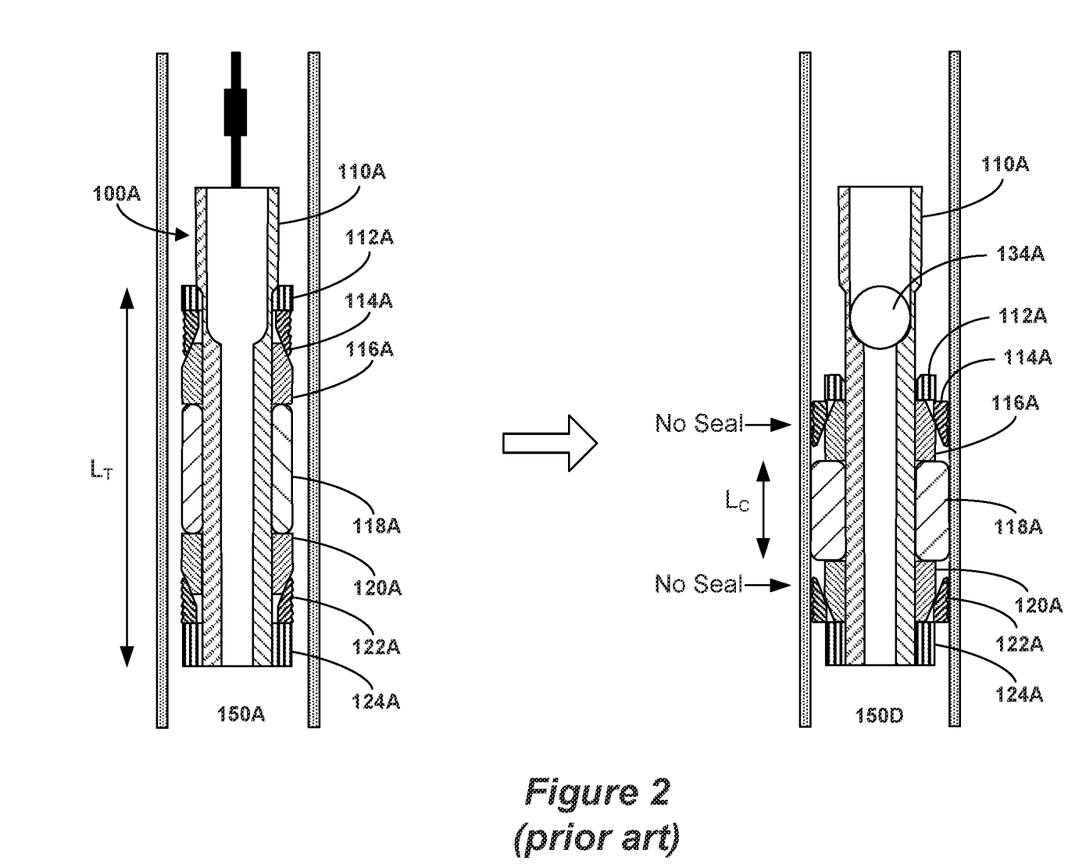
FIG. 2 illustrates a plug in accordance with the prior art.

FIG. 2 illustrates the plug 100A in the run-in (150A) and sealing (150D) conformations. Notice that each of the components along the length of the plug, i.e., the top and bottom slips 114A and 122A, the top and bottom cones 116A and 120A, and the sealing member 118A contribute to the length of the plug. The plug 100A must have a length of at least $L_T$ to accommodate each of those components. Those components also add weight to the plug. The sealing (i.e., set) configuration 150D only provides a total sealing contact patch length of $L_C$, which is small fraction of the tool length $L_T$. The regions of the plug where the slips grip the casing are not sealed. In tight corners, for example, in highly deviated wells, a longer tool can be a hindrance. Thus, there is a need in the art for a shorter plug (e.g., fracking/bridge plug) that still provides an adequate contact patch of the sealing member for adequate sealing.

SUMMARY

Disclosed herein is a tool for sealing in a tubing, the tool comprising: a mandrel having an axial bore extending therethrough; a top slip assembly configured upon the mandrel; a bottom slip assembly configured upon the mandrel, and a monolithic elastomeric sealing member having a first portion disposed between the top slip assembly and the bottom slip assembly, a second portion encapsulating the top slip assembly, and a third portion encapsulating the bottom slip assembly. According to some embodiments, the tool is configured to be actuated from a run-in configuration to a set configuration by applying force to the tool to cause: (i) the top slip assembly to move toward the bottom slip assembly, (ii) the bottom slip assembly to move toward the top slip assembly, or (iii) the top and bottom slip assemblies to move toward each other. According to some embodiments, the tool is configured such that when the tool is actuated, the third portion of the elastomeric sealing member is compressed between the top slip assembly and the bottom slip assembly, causing the elastomeric sealing member to deform and form a sealing engagement with the tubing. According to some embodiments, the tool is configured such that when the tool is actuated, the top slip assembly and bottom slip assembly each expand to engage the tubing. According to some embodiments, the tool is configured such that when the slip assemblies engage the tubing, teeth on the top slip assembly puncture the first portion of the elastomeric sealing member and teeth on the bottom slip assembly puncture the second portion of the elastomeric sealing member. According to some embodiments, the tool is configured such that when the tool is in the set configuration, the elastomeric sealing member forms a contact patch with the tubing, wherein the contact patch extends over the top slip assembly and bottom slip assembly. According to some embodiments, the elastomeric sealing element comprises a polyurethane material. According to some embodiments, the elastomeric sealing element comprises one or more materials selected from the group consisting of polyvinyl alcohol (PVA), styrenic block copolymers (TPE-s), copolyesters (COPEs), thermoplastic polyurethanes (TPU), polyamides (PEBA), thermoplastic polyolefinelastomers (TPE-o), polyolefin alloys (TPV), and thermoplastic olefinic elastomers (TPOs)). According to some embodiments, the elastomeric sealing element comprises PVA compounded with one or more of styrenic rubber, elastomeric nylon, ethylene-vinyl acetate (EVA), and foaming agents. According to some embodiments, one or more of the mandrel and the slips comprises a degradable material. According to some embodiments, the degradable material is a degradable metal. According to some embodiments, the degradable material is a degradable polymer. According to some embodiments, the degradable material is a degradable polymer blended with a degradable metal.

Also disclosed herein is a method of making a tool, wherein the tool comprises, a mandrel having an axial bore extending therethrough; a top slip assembly configured upon the mandrel; a bottom slip assembly configured upon the mandrel, and a monolithic elastomeric sealing member having a first portion disposed between the top slip assembly and the bottom slip assembly, a second portion encapsulating the top slip assembly, and a third portion encapsulating the bottom slip assembly, the method comprising: assembling the top slip assembly and the bottom slip assembly upon the mandrel, and installing the elastomeric sealing member onto the tool. According to some embodiments, installing the elastomeric sealing member onto the tool comprises injection molding.

DESCRIPTION

FIGS. 3A-3C illustrate an embodiment for an improved plug 300, which may be a frack plug or bridge plug, for example. Referring to FIG. 3A, the plug 300 comprises a mandrel 302 upon which the other components of the plug are disposed. The plug comprises a setting ring 304 configured to receive pressure from a setting tool (not shown). The setting ring 304 may be held in place by a shearing ring (not shown), as is known in the art. Top slips 306, bottom slips 308 and a cone 310 are also configured on the mandrel 302. The plug 300 may also comprise a base section 312. Mandrel 302 may include a longitudinally extending tubular portion 303 terminating at base section 312. Base section 312 may have an enlarged outer diameter relative to the outer diameter of the tubular portion 303. Cone 310 may include an upper angled surface 311 and a lower angled surface 313. Top slips 306 may be in sliding engagement with upper angled surface 311 of cone 310. Bottom slips 308 may be in sliding engagement with lower angled surface 313 of cone 310.

Referring to FIG. 3B, the top and bottom slips 306 and 308 and the cone 310 are encapsulated in an elastomeric sealing element 314. In FIG. 3C, the elastomeric sealing element 314 is depicted as transparent for the purposes of illustration. The elastomeric sealing element 314 is monolithic, i.e., it is as a single unit. A first portion of the elastomeric sealing element 314a is disposed in the space between the top slips 306 and the bottom slips 308. A second portion of the elastomeric sealing element 314b is disposed upon the top slips 306, thereby encapsulating the top slips. A third portion of the elastomeric sealing element 314c is disposed upon the bottom slips 308, thereby encapsulating the bottom slips.

When the plug 300 is run into the wellbore to the proper depth, force can be applied to the setting ring 304 to actuate the tool. The force is transferred through the setting ring to the slips (306, 308) causing them to expand by riding up on the cone 312, as illustrated. As the elastomeric sealing element 314 is squeezed between the slips, the sealing element expands to form a seal with the casing. As the slips ride up on the cone, teeth of the slips may puncture the elastomeric sealing element and bite into the inner surface of the casing. Since the slips are completely sheathed within the elastomeric sealing element, the elastomeric material of the sealing element effectively seals any gaps between the teeth of the slips and the casing, forming a fluid-tight seal that effectively extends from the setting ring 304 to the base section 312.

Figure 4:
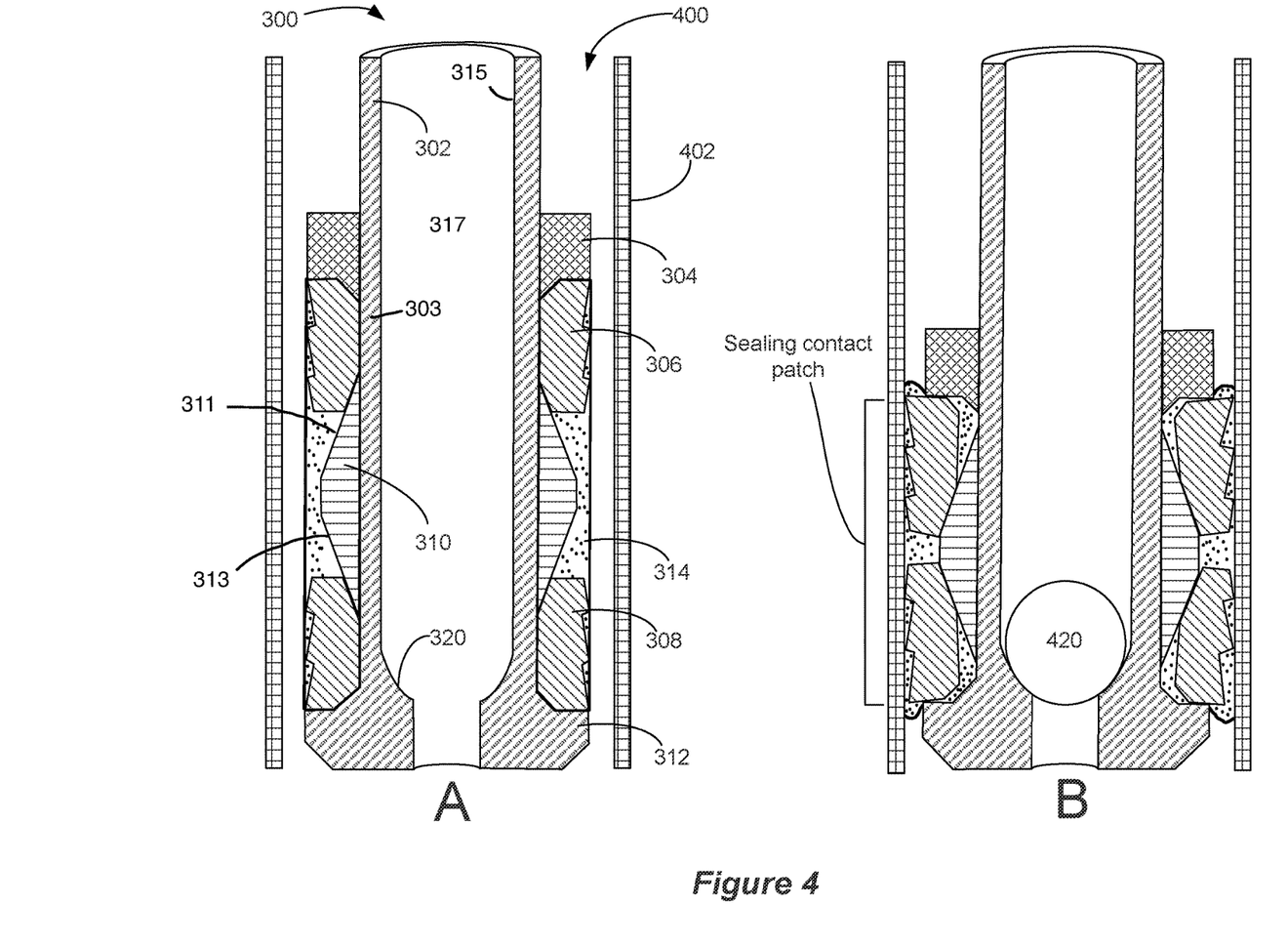
FIG. 4 illustrates a plug in accordance with an embodiment of the disclosure deployed in a cased wellbore.

FIG. 4 illustrates a cross section drawing, the plug 300 deployed in a wellbore 400 having a casing 402. As is visible in the cross section drawing, the plug 300 comprises a ball seat 320 (similar to ball seat 103A of the prior art plug 100A, FIG. 2). Mandrel 302 may include inner bore wall 315 defining axial bore 317 of mandrel 302. Inner bore wall 315 of mandrel 302 may include ball seat 320. FIG. 4A illustrates the plug 300 in the run-in configuration and FIG. 4B illustrates the set configuration. The plug is actuatable between the run-in and set configurations, for example, by applying force to the setting ring. Notice that when plug 300 is set in place the sealing contact patch of the elastomeric sealing element 314 with the casing extends from the setting ring 304 to the base section 312. Compare this to the prior art plug 100A (FIG. 2), wherein the contact patch Lc of the sealing member 118A is confined to the space between the slips (116A, 120A) and is therefore, much smaller compared to the length of the tool. Thus, the plug 300 provides a higher sealing contact patch relative to the length of the tool compared to plugs in the prior art. A ball 420 is also illustrated in FIG. 4B.

Figure 5:
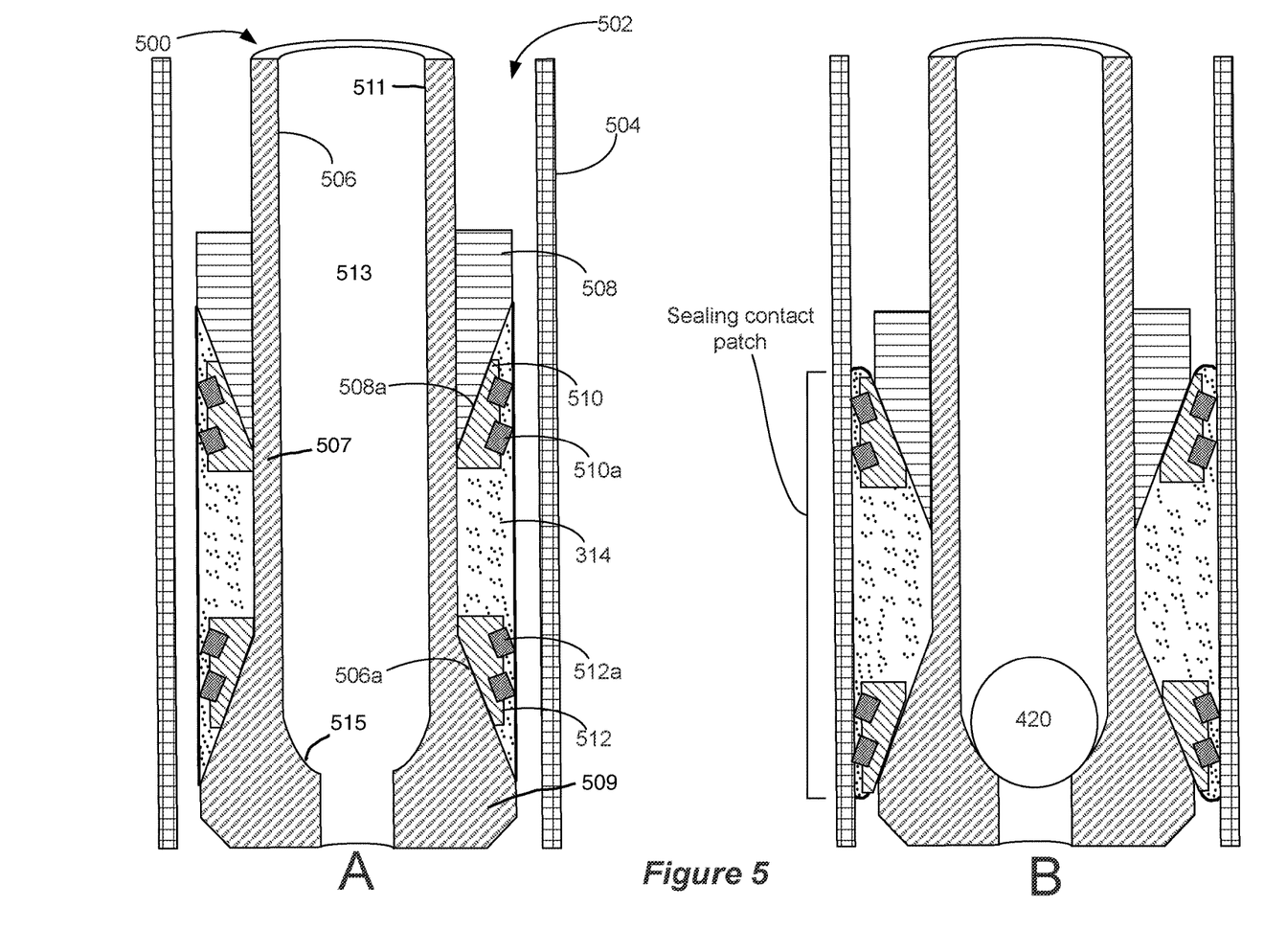
FIG. 5 illustrates a plug in accordance with a further embodiment of the disclosure deployed in a cased wellbore.

FIG. 5 illustrates an alternative embodiment of a plug 500 in the run-in (FIG. 5A) and set (FIG. 5B) configurations, as deployed in a wellbore 502 having a casing 504. The plug 500 comprises a mandrel 506, upon which a set ring 508, top slips 510, and bottom slips 512 are configured. The slips are encapsulated in an elastomeric sealing element 314. Notice that the plug 500 does not include a cone. Instead, the set ring 508 comprises an angled surface 508a, which is configured to drive the top slips 510 into the casing as force is applied to the set ring (see FIG. 5B). Likewise, the mandrel 506 comprises an angled surface 506a, which is configured to drive the bottom slips 512 into the casing as force is applied to the set ring. Mandrel 506 may include a longitudinally extending tubular portion 507 terminating at a base section 509. Base section 509 may have an enlarged outer diameter relative to the outer diameter of the tubular portion 507. Mandrel 506 may also include inner bore wall 511 defining axial bore 513 of mandrel 506. Inner bore wall 511 of mandrel 506 may include ball seat 515.

Another difference between the plug 500 and the plug 300 (FIGS. 3 and 4) resides in the illustrated slips. The slips (306, 308) of the plug 300 are depicted with integral teeth (i.e., the slips are depicted as a single component having teeth). The slips (510, 512) of the plug 500 are depicted with recessed pockets in which teeth (510a, 512a) formed of a gripping material (e.g., a metal or ceramic material) may be inset (e.g., with an epoxy). It should be appreciated that either slip configuration (as well as other slip configurations known in the art) may be used in any embodiment of the disclosed plug.

As illustrated in FIG. 5B, when force is applied to the set ring 508 of the plug 500, the slips (510, 512) are driven onto their respective angled surfaces and forced outward so that the teeth of the slips engage the inner surface of the casing. The teeth (510a, 512a) may pierce the elastomeric sealing element 314 to form that engagement. Since the elastomeric sealing element 314 is configured to encapsulate both the bottom and top slips, the set configuration comprises an extended sealing contact patch that extends over the length of the slips, which is, again, larger in proportion to the length of the tool compared to the contact patch $L_C$ provided by the prior art tools (FIG. 2). A ball 420 is also illustrated in FIG. 5B.

Figure 3:
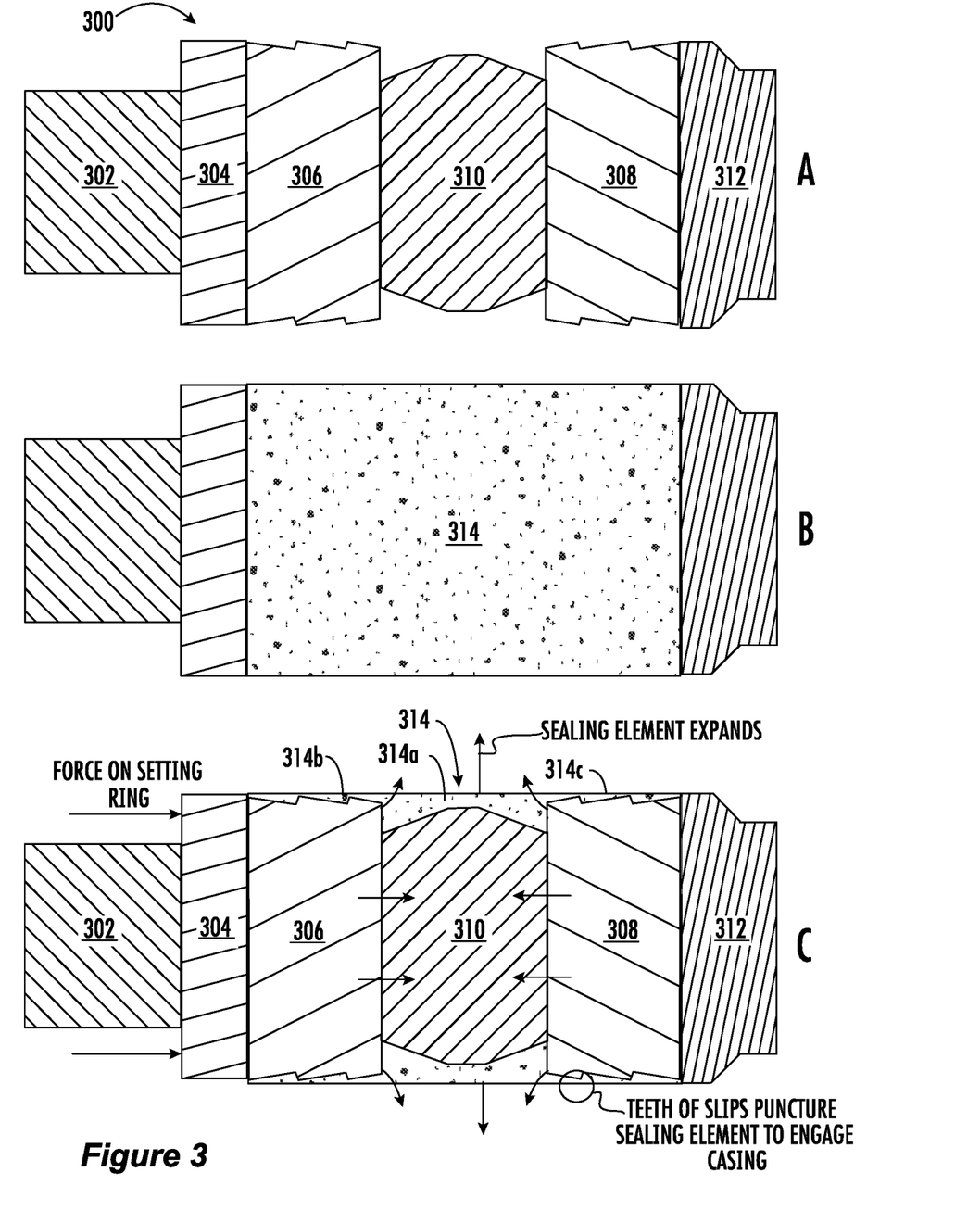
FIG. 3 illustrates a plug in accordance with an embodiment of the disclosure.

Thus, the illustrated plug embodiments share several features in common. The plugs each comprise slips (e.g., top slips and bottom slips) that are configured to engage the inner surface of a casing when they are driven into the casing by being forced upon an angled surface. In the plug 300 the angled surface is provided by the cone 310; in the plug 500 the angled surface is provided by the set ring 508 on top and an angled surface 506a integrated into the mandrel 506 on bottom. Other configurations are within the ability of those of skill in the art. Each of the plugs 300 and 500 comprise an elastomeric sealing element 314 that encapsulates the slips. Thus, when the elastomeric sealing element is squeezed under force, the sealing element provides a sealing contact patch that covers not only the space between the slips (as in the prior art), but also encompasses the area where the slips engage the inside of the casing. The teeth of the slips may pierce the elastomeric sealing element to engage the casing and the spaces between the teeth are effectively sealed by the sealing element material.

The encapsulating elastomeric sealing element 314 can generally comprise any polymeric material with elastomeric properties that enable the sealing element to expand radially and seal against in the inner surface of the casing, as described above and also to effectively seal spaces between the teeth of the slips when the slips engage the casing. According to some embodiments, the elastomeric sealing element can comprise a polyurethane material. Other materials that are suitable for making the elastomeric sealing element include polyvinyl alcohol (PVA), either neat or compounded with other materials, such as one or more of styrenic rubber, elastomeric nylon, ethylene-vinyl acetate (EVA), foaming agents, and the like. Still other materials include styrenic block copolymers (TPE-s), copolyesters (COPEs), thermoplastic polyurethanes (TPU), polyamides (PEBA), thermoplastic polyolefinelastomers (TPE-o), polyolefin alloys (TPV), thermoplastic olefinic elastomers (TPOs) such as reactor TPOs (R-TPO), polyolefin plastomers (POP), and polyolefin elastomers (POE). Still other materials include natural rubber, gum rubber, BUNA rubber, Vyton rubber, vulcanized rubber, and silicone. Natural rubber may include rubbers known as India rubber, latex, Amazonian rubber, caucho or cautchouc, and as initially produced, comprises polymers of the organic compound isoprene with minor impurities of other organic compounds, plus water.

The plugs described herein (such as plugs 300 and 500) may be configured as traditional drillable plugs or may be configured as dissolvable/degradable plugs. The components of the drillable plugs comprise materials typically used for such components, as is known in the art. For example, the mandrel, setting ring, cones, and slips may independently comprise metallic materials, such as cast iron, aluminum, or the like. Alternatively, they may comprise composite materials, such as fiberglass-epoxy; mandrel-wound fiberglass-epoxy; 2-dimensional layered fiberglass epoxy, and the like. Still alternatively, they may comprise pultruded composites using a variety of resins including polyester, vinyl ester, and epoxy, and reinforcements including mat/roving (MR-GFRP) or unidirectional (U-GFRP) fiberglass, or high-performance unidirectional carbon fiber. Still alternatively, they may comprise a thermoset composite or thermoplastic composite, such as TPU, nylon, polyether ether ketone (PEEK), polyaryl ether ketone (PAEK), polypropylene, polyethylene, acrylonitrile butadiene styrene (ABS), polycarbonate, polyvinyl chloride (PVC), or virtually any polymer. As mentioned above, some embodiments of the slips are configured with recessed pockets in which teeth formed of a gripping material (e.g., a metal or ceramic material) may be inset (e.g., with an epoxy). Each of these components may be manufactured by any techniques known to those of skill in the art.

Other embodiments of the plugs described herein may be degradable/dissolvable. The inventor has determined that polyvinyl alcohol (PVA) exhibits desirable strength and degradability properties for use in tools, tool components, and balls for downhole applications. In particular, and as will be described in greater detail below, the inventor has determined that fiberglass-reinforced PVA compounds can be utilized to create downhole tools, tool components, and balls that exhibit desirable strength and degradability properties. In addition, the inventor has determined that certain PVA compounds can also be utilized to manufacture degradable sealing elements (i.e., flexible components).

PVA is a water-soluble polymer having an ideal formula of $[CH_2CH(OH)]n$. PVA's repeat unit includes a hydroxyl functional group having a random stereochemistry along the polymer chain (i.e., PVA is atactic). PVA is generally produced by a two-step process: 1) the polymerization of vinyl acetate to form polyvinyl acetate and 2) the hydrolysis of the acetate groups in the polyvinyl acetate to form PVA. The properties of PVA are highly dependent on its molecular weight and the degree of hydrolysis (i.e., the percentage of acetate groups that are hydrolyzed). The molecular weight of PVA is controlled by controlling the vinyl acetate polymerization reaction and the degree of hydrolysis is controlled by controlling the extent of the hydrolysis reaction. As molecular weight and/or the degree of hydrolysis increases, PVA exhibits increased viscosity, increased tensile strength, and increased water and solvent resistance. As molecular weight and/or the degree of hydrolysis decreases, PVA exhibits decreased viscosity, increased flexibility, and increased solubility. PVA can be categorized based upon its degree of hydrolysis as fully hydrolyzed (e.g., >97 mol %), medium hydrolyzed (e.g., 95 to 97 mol %), and partially hydrolyzed (e.g., 85 to 95 mol %).

The inventor has specifically observed beneficial properties of the following raw PVA compounds for uses in different applications in downhole operations: Kuraray Mowiflex C 17 (formerly Mowiflex TC 253), Kuraray Mowiflex C 30 (formerly Mowiflex TC 232), and Kuraray Mowiflex H 15. The Mowiflex C 17 PVA compound contains greater than 96 wt % PVA and has a glass transition temperature of 62° C., a density of 0.6 to 0.9 $g/cm^3$, and a melt flow index of 14-20 g/10 min at 190° C. and a load of 21.6 kg. The Mowiflex C 30 PVA compound contains approximately 75 wt % PVA, 20 wt % aliphatic polyols (plasticizer), and 5 wt % calcium stearate (lubricant) and has a glass transition temperature of 35° C., a density of 0.6 to 0.9 $g/cm^3$, and a melt flow index of 20-40 g/10 min at 190° C. and a load of 21.6 kg. The Mowiflex H 15 PVA compound has a melt flow index of approximately 15 g/10 min at 230° C. and a load of 2.16 kg. The melt flow index values of these raw PVA compounds may be determined in accordance with the ASTM D1238 and/or ISO 1133 test procedures. The properties of the C 17 and C 30 raw PVA compounds are listed in data sheets which are submitted in an information disclosure statement in conjunction with the filing of this application and which are incorporated herein by reference. While these specific grades of PVA compounds are described for purposes of illustration, it will be understood that other types and grades of raw PVA compounds are also suitable materials for manufacturing the types of tools, tool components, and balls for downhole operations described in this application. As used herein, the term raw PVA compound refers to an initial material that contains an appreciable quantity of PVA (such as those described above), which is typically supplied by a PVA manufacturer in powder or pelletized form and which can be shaped into a final product or further processed before final shaping. It will be appreciated from the above examples that raw PVA compounds may include materials other than PVA and may include PVA of varying molecular weights and degrees of hydrolysis. Raw PVA compounds can be processed by blending with other polymers and/or adding colorants, fillers, or reinforcing materials to obtain a processed PVA compound having the desired properties. Thus, as used herein, the term processed PVA compound refers to a PVA compound that has been processed to include these various additional materials and may exist as a pellet, a melt, a powder, or a final shaped component. The term PVA compound may refer to either a raw PVA compound or a processed PVA compound.

Processed PVA compound that includes a fiberglass reinforcing material exhibits strength and elasticity properties that are comparable to materials that are used in the manufacture of commercially available degradable downhole components. For example, the fiberglass-reinforced processed PVA compound has a tensile strength of approximately 30,000 psi, which exceeds the tensile strength of pure PVA (approximately 14,000 psi), PGA (approximately 16,000 psi), and PA6 (Nylon 6) (approximately 12,000 psi). The fiberglass-reinforced processed PVA compound additionally exhibits a flexural strength of approximately 47,000 psi, which exceeds the flexural strength of pure PVA (approximately 21,000 psi), PGA (approximately 28,000 psi), and PA6 (Nylon 6) (approximately 12,300 psi). As such, the fiberglass-reinforced processed PVA compound's strength characteristics render it suitable for use in manufacturing degradable downhole tools, tool components, and balls. It has also been observed that the elasticity of the fiberglass-reinforced processed PVA compound renders it suitable for use in downhole applications while also decreasing the susceptibility of components manufactured from the processed PVA compound to shear failure. The specific gravity of components and balls produced from the fiberglass-reinforced processed PVA compound is approximately 1.6 to 1.7, which allows balls produced from the processed PVA compound to be conveyed downhole in standard fracture fluids. As will be described in greater detail below, the specific gravity of balls and components manufactured from the fiberglass-reinforced processed PVA compound can be altered to meet specific requirements by making minor modifications to the manufacturing process. It should be noted that any of the degradable polymers described above can be used to manufacture plugs and/or balls according to this disclosure. Likewise, degradable metals, such as magnesium and degradable magnesium alloys can be used.

In addition, the fiberglass-reinforced processed PVA compound exhibits superior degradability relative to existing degradable downhole tools and components. In a test environment, a ⅞" diameter ball was observed to completely dissolve in 175° F. water in eight hours while another ⅞" diameter ball was reduced to ⅝" diameter in 24 hours in 70° F. water. Components formed from the fiberglass-reinforced processed PVA compound begin to degrade (i.e., dissolve) in water at ambient conditions (i.e., 70° F.). Relatively low temperature fracture fluid has little or no effect on the structural integrity of components formed from the fiberglass-reinforced processed PVA compound. However, when such components are exposed to fluids at increased temperatures, they degrade quickly. These properties make the fiberglass-reinforced processed PVA compound ideally suited for use in downhole applications such as hydraulic fracturing because the temperature of the fresh fracture fluid acts to inhibit degradation of the components during the hydraulic fracture operation and to enable degradation after the operation is complete and fluid temperatures increase. The degradation rate of the fiberglass-reinforced processed PVA compound can be modified through the addition of a material such as polyethylene or PA6. Moreover, PVA is biodegradable and is harmless at the extremely low concentrations that would result from the dissolution of relatively small components in a large volume of fluid. In addition, the small quantities of glass fibers are flushed back to the surface and are largely undetectable.

FIGS. 4 and 5 illustrate cross-sectional views of plugs 300 and 500 and a ball 420 for use in a downhole operation (e.g., a hydraulic fracturing operation) is depicted. The ball 420 and the components of the plugs 300 and 500 are examples of components that may be formed from a PVA compound. As will be described in greater detail below, the manufacturing processes associated with PVA compounds enable the creation of structures having practically any shape or size.

According to some embodiments, components of the tool may comprise unprocessed or processed PVA, as described above, blended with a degradable metal. For example, the PVA polymers that are combined with the degradable metal may be raw PVA, fiberglass reinforced PVA, and/or mineral filled PVA (for example, blended with a mineral fill of about 5%-60%). Examples of suitable mineral fills include solid glass spheres, hollow glass spheres, barium sulfate, calcium carbonate, calcium sulfate, mica, pigments and dispersions, precipitate silica, talc, titanium dioxide, wollastonite, clays, aluminum hydroxide, magnesium hydroxide, magnesium hydroxide, natural calcium carbonate and dolomite, kaolin, fumed silica, cristobalite, quartz, precipitated calcium carbonate, calcined clay, and the like.

Examples of suitable degradable metals include degradable magnesium and/or degradable magnesium alloys. For example, degradable magnesium alloys may comprise magnesium alloyed with one or more elements that act as accelerants, meaning that the added element(s) have a different galvanic corrosion potential than the magnesium. Examples of suitable accelerants include aluminum, zinc, iron, copper, tungsten, nickel, zinc, zirconium, and the like. One example of a suitable degradable alloy is magnesium doped with 0.001% to 20% nickel. Other examples of suitable degradable metals are disclosed in United States Patent Publication No. 2018/0016662 A1, the entire contents of which are incorporated herein by reference.

According to some embodiments, the degradable metal is provided in a form that can be readily blended into a PVA material. For example, the degradable metal may be a flake, a powder, a chip, or the like. According to some embodiments, the degradable metal is added to the PVA by compounding the degradable metal as a masterbatch in a carrier polymer, which can be mixed with the base PVA material at the extruder step. A masterbatch of the degradable polymer may comprise 50-100 wt. % of the degradable metal compounded with a carrier. Examples of suitable carriers include PVOH, nylon, polystyrene, EVA, and virtually any polymer that is miscible with PVOH. Alternatively, degradable metal may be added directly to the PVA at the extruder step. Still alternatively, the degradable metal may be added to the PVA during a toll-processing step, for example, the at same stage at which colorants, fibers, and/or other mineral fills are added to the PVA.

According to some embodiments, the degradable metal may be treated with a fluid to prevent oxidation of the degradable metal and/or to prevent the degradable metal from auto-igniting during processing, such as during extrusion. Examples of treating fluids include fluids comprising hydrotreated hydrocarbons such as hydrotreated heavy naphtha (petroleum) and distillates thereof.

As mentioned above, any of the PVA materials described above may be blended with the degradable alloy to form materials suitable high-salinity degradable downhole components. One particularly suitable class of PVA materials is the processed PVA that includes fiberglass reinforcing materials, as described above. According to some embodiments, the degradable metal may be blended with the PVA material at a loading of 0.01 to 75%. According some embodiments, the loading may be 2 to 50%, or 10 to 30%. One exemplary embodiment is a loading of 2.5% degradable metal to PVA material.

The non-fiber-reinforced PVA materials can also be blended with the degradable metals, as described above. For example, one particularly suitable embodiment comprises a blend of the Kuraray Mowiflex C 17 and Kuraray Mowiflex H 15 (each described above) further blended with the degradable metal. According to one embodiment, the blend comprises 75% H 15 and 25% C-17. The blend may comprise 5%-60% mineral fill or may not comprise mineral fill.

Tools comprising the PVA materials and degradable metal may be manufactured using any of the manufacturing processes described herein. Examples include injection molding, casting, compression molding, profile extrusion, and the like.

As described above the main body of the plugs (e.g., 300, 500) is formed by a mandrel through which an axial bore extends and about which additional components are arranged. Again, these additional components include set rings, slips, cones, and sealing element. In one embodiment, each component of the plug as well as the ball may be formed from a PVA compound. For example, in one embodiment, the ball and the structural components of the plug may be formed from a rigid fiberglass-reinforced PVA compound, which may be produced from a long fiber reinforced or a short fiber reinforced PVA compound with 5-60 wt % fiberglass. It has been determined that PVA compounds in which the PVA component has a higher molecular weight and/or a higher degree of hydrolysis (e.g., medium or fully hydrolyzed), such as the Mowiflex C 17 compound, are particularly well-suited for use in manufacturing such structural components, although other PVA compounds are also suitable. While the ball 420 and structural components of the plug may be formed from a PVA compound that includes a reinforcing material such as fiberglass, the reinforcing material is not essential and the ball 420 and structural components of the plug may also be formed from a PVA compound that does not include a reinforcing material.

In one embodiment, the sealing element 314 may be formed from a more flexible PVA compound. Therefore, the mandrel, setting ring, slips, and/or cones may be formed from a first PVA compound and the sealing element 314 may be formed from a second, different PVA compound. It has been determined that PVA compounds in which the PVA component has a lower molecular weight and/or a lower degree of hydrolysis (e.g., partially hydrolyzed) or that include a plasticizer (e.g., a polyol plasticizer), such as the Mowiflex C 30 compound, are particularly well-suited for use in manufacturing such flexible components, although other PVA compounds are also suitable. The C 30 compound is both flexible enough that it can be utilized to form components that are used to generate fluid tight seals and strong enough to maintain such fluid tight seals even at the elevated pressures that are observed in downhole operations such as hydraulic fracturing.

While the described plugs may be constructed completely from PVA materials, in one embodiment, certain components may be wholly constructed from other materials (either degradable or non-degradable). For example, one or more of the components of the plugs may be wholly constructed from another degradable material such as a degradable metal or a different degradable polymer. Likewise, one or more components of the plugs may be wholly constructed from a non-degradable material. For example, it may be desirable to form components such as slips, which are configured to engage an interior wall of a conduit to maintain the position of the plug within the conduit, from a non-degradable metal. Likewise, the slips may be formed primarily from a degradable metal, but the gripping surface (i.e., the surface that engages the conduit) may be formed from an abrasive material such as Tungsten carbide (see FIG. 5). In such an embodiment, the abrasive material may be deposited onto the degradable composite metal material using a deposition process such as cold-spray deposition or by using an electroplating process. Similarly, while sealing element 314 may be made degradable by forming it from a PVA compound as described above, it may be desirable in some applications to utilize a more traditional material for sealing such as nitrile rubber or reinforced polyurethane, as described above.

As will be described below, the ball 420 and the components of the plug may be formed using an injection molding process. Likewise, the ball and the components of the plug may be formed using an extrusion process and then machined (if necessary) to a final form.

Figure 6:
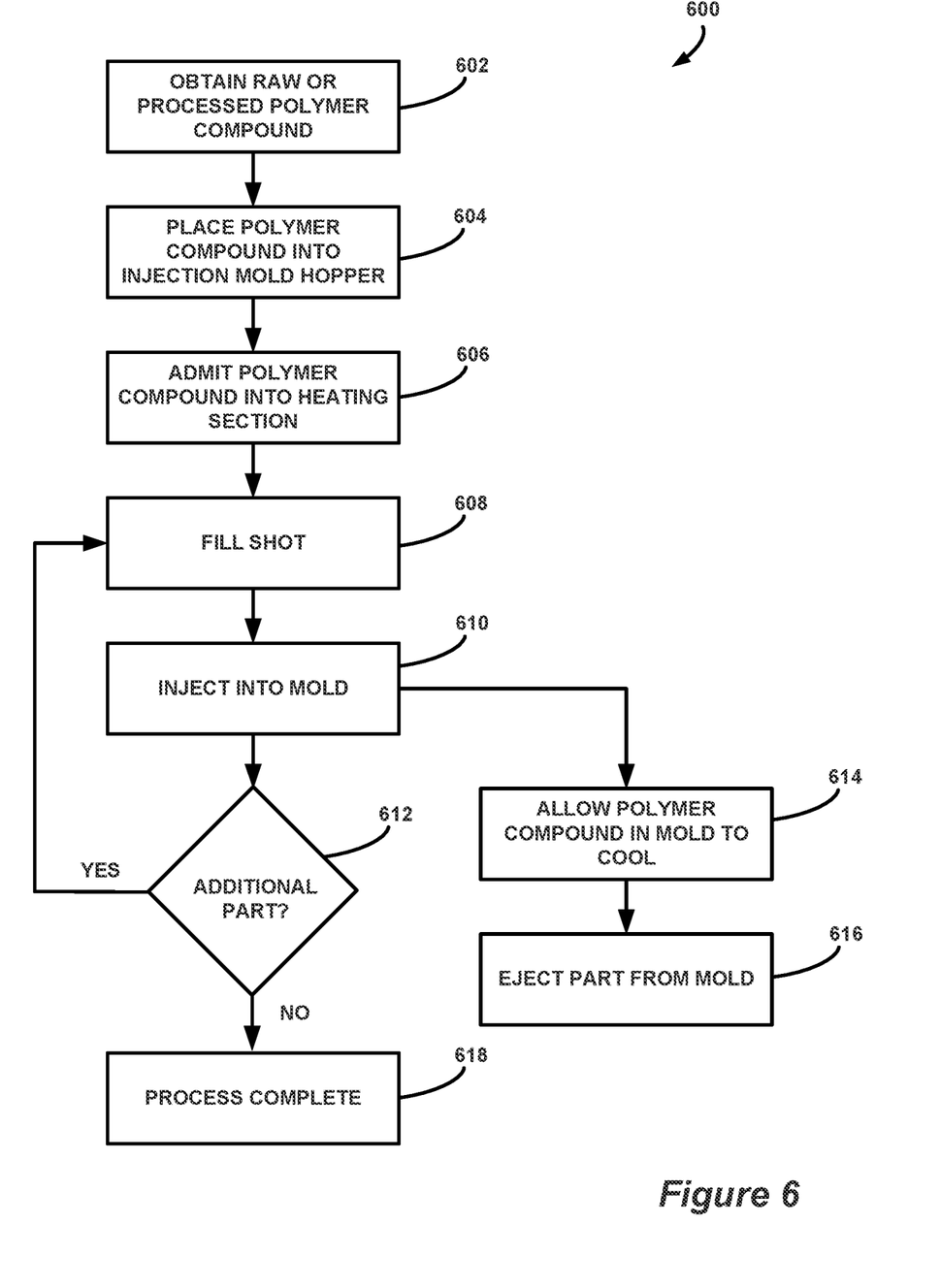
FIG. 6 is a flowchart that illustrates the steps of an injection molding process for producing tools and other components from a degradable material in accordance with an embodiment of this disclosure.

Referring to FIG. 6, a flow chart illustrates the steps in a process 600 for producing tools, tool components, and balls from a polymer compound by injection molding. Initially, a desired raw or processed polymer compound is obtained (step 602), typically in a pellet or powder form. It is beneficial at this point to discuss the different processing that can be performed to obtain the various types of processed polymer compounds that may be utilized in the injection molding and extrusion processes.

As described above, a reinforcing material can be integrated into a raw polymer compound to improve strength. The reinforcing material may include fiberglass, carbon fiber, an aramid fiber such as Kevlar, Basalt fiber, or other similar reinforcing materials. In one embodiment, the raw polymer compound is processed to generate a long fiber reinforced polymer compound. Long fiber reinforced materials are defined by their incorporation of substantially parallel fibers (such as glass fibers) that are all of the same length as each other and as the plastic component (e.g., the pellet). Long fiber reinforced polymer pellets are typically produced by a specialty provider through a process such as pultrusion, which essentially results in the coating of the reinforcing fiber with the raw or processed polymer compound. The Kuraray Mowiflex C 17 raw polymer compound and other similar raw polymer compounds are well-suited for use in creating a long fiber reinforced polymer compound to be used to form rigid components. In one embodiment, the long fiber reinforced polymer compound is 50 wt % fiberglass. However, the fiberglass content may range from 5-60 wt %. In one embodiment, the long fiber reinforced polymer pellets have a diameter of ⅛" and a length of ½" (e.g., similar to a grain of rice).

Figure 7:
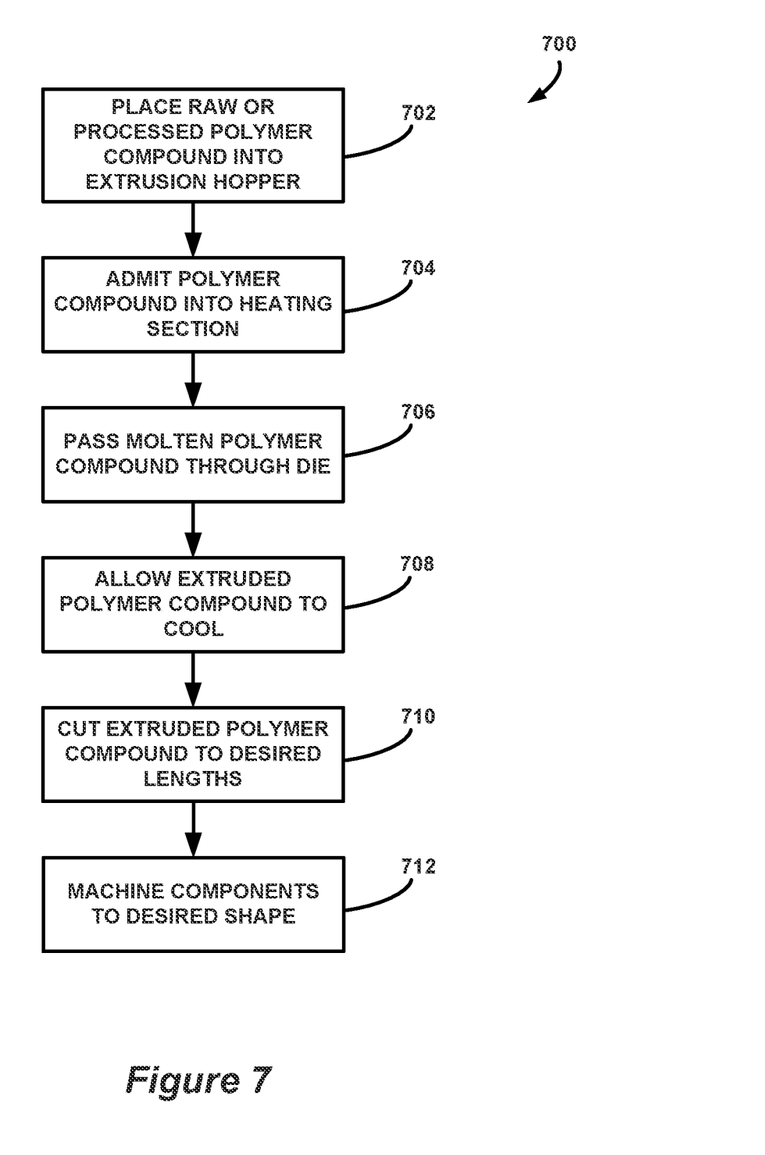
FIG. 7 is a flowchart that illustrates the steps of an extrusion process for producing tools and other components from a degradable material in accordance with an embodiment of this disclosure.

In contrast to long fiber reinforced materials, short fiber reinforced materials are defined by their incorporation of various lengths of fibers that are randomly oriented within the plastic material. Polymer compounds can also be processed to generate a short fiber reinforced polymer compound. Short fiber reinforced polymer compounds can be created during the compounding stage, the injection molding process 600, or extrusion process 700 by mixing short glass fibers with the polymer compound in the injection molding or extrusion hopper. As with long fiber reinforced polymer compounds, short fiber reinforced polymer compounds may include a fiberglass content of 50 wt %, or a fiberglass content within a range from 5-60 wt %. The short and long fiber reinforced polymer compounds may include multi-compatible, standard e-glass solid fibers that are 17 microns in filament diameter, although other sizes (such as 5-17 micron diameter) and types of fibers may also be used. The content of reinforcing material may be altered to obtain desired strength and specific gravity measures of components generated from the processed polymer compound.

Polymer compounds can also be processed by blending the polymer compound (such as the above-described C 17, C 30, and H 15 compounds) with another polymer (i.e., a blend polymer). For example, the polymer compound can be blended with a polymer such as Nylon-6, PGA, PLA, and/or polyethylene to obtain desired properties (e.g., degradation rate, specific gravity, tensile strength, etc.). In particular, it has been observed that blending a polymer compound with Nylon-6 (PA6 or polycaprolactam) results in the decrease of degradation rates by as much as 80% (as compared to the non-blended polymer compound) without significantly changing the mechanical properties. The PVA compound may include 1-25 wt % PA6, or, more specifically, between 1-3 wt %, 4-6 wt %, 9-11 wt %, 14-16 wt %, 19-21 wt %, or 24-25 wt % (excluding reinforcing or other fill materials) PA6. When reinforcing or other fill materials are included, the processed polymer compound may include approximately 0.5-24 wt % PA6. PA6 and other polymers are blended with the polymer compound by melting the polymer compound and the blend polymer together in the appropriate ratio and obtaining a uniform mixture. The blending process may be accomplished during the injection molding or extrusion process by mixing the blend polymer with the polymer compound in the hopper in the desired ratio. The blending process may also be accomplished as part of the addition of other materials such as reinforcing materials. For example, a specialty provider of long fiber reinforced pellets may add the blend polymer to the polymer compound during the creation of the long fiber reinforced pellets.

In addition to blend polymers and reinforcing materials, other materials such as colorant and fill materials can be added to polymer compounds. In one embodiment, an ethylene-vinyl acetate (EVA) carrier polymer with a desired color concentrate is added to the polymer compound. Colorants have been added to polymer compounds in ratios of 0-3 wt % (excluding reinforcing or other fill materials but including any blend polymers). A colorant can be used to generate a polymer compound having a color that distinguishes it from other grades or types. Fill materials such as talc, calcium carbonate, glass powder, glass spheres, gas bubbles, or other metal or ceramic powder can also be added to the polymer compound in ratios of 5-60 wt % to obtain desired characteristics such as specific gravity. In one embodiment, the specific gravity of components produced from the polymer compound may be reduced by incorporating hollow glass spheres to create void spaces. Injecting gas bubbles into the melt using a process like MuCell by Trexel Corporation can also decrease the apparent specific gravity of the finished product without compromising strength. Alternatively, metal powders, degradable and not, can be added to the polymer to increase the apparent specific gravity of the finished product. Like blend polymers and reinforcing material, fill materials and colorants can be added to the polymer compound during the injection molding process 600 or the extrusion process 700 or during the addition of reinforcing material. Colorants and fill materials may also be present in raw polymer compounds. While several different types of processed polymer compounds have been described, tools, tool components, and balls may also be produced from raw polymer compounds using the injection molding process 600 and the extrusion process 700.

The obtained raw or processed polymer compound (as well as any additional materials that are to be added during the injection molding process 600) is placed into the hopper of an injection molding machine (step 604) from where it is admitted into a heating section of the injection molding machine (step 606). In one embodiment, the heating section of the injection molding machine includes six to eight heater bands, although more or fewer heater bands might also be used. The heating section imparts thermal energy into the polymer compound and creates a molten polymer mixture that is conveyed through the heating section. The polymer material is conveyed through the heating section by a screw. In one embodiment, the temperature of each band of the heating section can be individually controlled. In one embodiment, the heater bands are controlled to increase the temperature from approximately 380° F. at the first heater band (i.e., the heater band closest to the hopper) to 400° F. at the last heater band (i.e., the heater band closest to the shot), although other temperature settings and gradients may be appropriate depending on the properties of the specific polymer compound.

As the molten polymer compound is conveyed through the heating section (i.e., via the rotation of the screw), it begins to fill the shot (step 608). The shot is a portion of the injection molding machine between the end of the screw that conveys material through the heating section and the entrance to the mold (i.e., the gate). The material in the shot is injected into the mold (step 610) by sliding the screw forward towards the shot. Typically, the volume of the shot slightly exceeds the volume of the mold such that the screw does not bottom out (i.e., there is always some material in the shot). It will be understood that a mold can be created to form practically any three-dimensional component from the polymer compound. For example, any of the components of the plug can be created via the injection molding process 600. The inventor has determined that the injection molding process 600 is particularly well-suited for the formation of balls 434 from a processed polymer compound containing long fiber fiberglass reinforcing material (with or without additional fill materials, colorants, etc.). Typically, the mold is made of either steel or aluminum, although other mold materials might also be employed. In one embodiment, the mold for ball 420 includes a feature such as an annular dovetail opposite the entrance to the mold to provide a pulling surface that allows the ball 420 to be extracted without damaging the portion of the ball 420 nearest the entrance of the mold. Similar features may also be included in molds for other components. The resulting features may then be removed from the completed part during final processing.

In one embodiment, the polymer compound in the shot is transferred into the mold through a large orifice. For example, the orifice may have a diameter of ⅜". Using a large orifice decreases the shear forces exerted on the polymer compound and reduces the likelihood that any included reinforcing materials such as glass fibers will fracture as the material is introduced into the mold. For the same reasons, the rate of injection into the mold (as determined by the rate of advancement of the screw into the shot) may also be decreased to a very slow rate. For example, the polymer compound may be introduced into the mold at a rate of approximately 0.01 in$^3$/sec. After the mold has been completely filled, the screw may exert and hold high pressure on the material in the mold. In one embodiment, the pack and hold pressure exerted by the screw is 20,000 psi. In another embodiment, the pack and hold pressure exerted by the screw may range from 10,000 psi to 20,000 psi, although other settings may also be used. The pack and hold pressure may be varied to slightly vary the specific gravity of the injection molded component.

After the screw is held in place to maintain the pack and hold pressure for several seconds, the material in the gate (the entrance to the mold cavity) begins to solidify. When this occurs, the screw may begin to be retracted. The polymer compound in the mold is allowed to cool to form a solid component (step 614). The residence time in the mold is dependent upon the volume of the polymer compound in the mold as well as the content of reinforcing material. Molds with larger volumes and polymer compounds having a higher content of reinforcing materials require longer residence times in the mold to solidify. By way of example, a 50 wt % fiberglass ball having a diameter of 3½" to 4" may require approximately 3-4 minutes of residence time to solidify while a 50 wt % fiberglass ball having a diameter of 2" may require 1-2 minutes of residence time to solidify. When the polymer compound in the mold has been allowed to cool for the proper time, the component may be removed from the mold (step 616). If an additional component is to be created (the "Yes" prong of step 612), the shot is refilled (step 608) as the screw is retracted (i.e., the screw is rotated to introduce material into the shot as it is retracted). In one embodiment, the shot is refilled at the same rate as the screw is retracted. Moreover, the screw may be retracted at a rate that corresponds to the residence time of the component in the mold. As such, when a component is ejected from the mold, the shot may be full of polymer compound material that can be introduced into the mold to form the next component. When no additional components are to be molded (the "No" prong of step 612), the process is complete (step 618).

As set forth above, the described injection molding process 600 may be utilized with any number of molds to create components having practically any imaginable features. While nearly any size and shape of components can be created using the injection molding process 600, ball molds may be created for standard sized balls having diameters from ⅞" to 5" in ⅛" intervals.

It has been observed that the injection molding process 600 results in a random orientation of glass fibers in the molded components. It has also been determined that this random fiber orientation results in desirable strength characteristics. Thus, the injection molding process 600 may be particularly well-suited for generating rigid structural components.

Referring to FIG. 7, a flow chart illustrates the steps in a process 700 for producing tools, tool components, and balls from a polymer compound by extrusion. Initially, a raw or processed polymer compound (as well as any additional materials that are to be added during the extrusion process 700) are placed into the hopper of an extrusion machine (step 702). Similar to the injection molding process 600, the pellets are admitted from the hopper into a heating section (step 704). Also like the injection molding process 600, the heating section may include multiple heater bands each having independent temperature control. In one embodiment, the first heater band (the heater band closest to the hopper) may be controlled to 380° F. and the last heater band (the heater band closest to the die) may be controlled to 400° F., although other temperature settings and gradients may be appropriate depending on the properties of the specific polymer compound. The molten polymer compound is conveyed through the heating section by the rotation of a screw. Because extrusion is a continuous process (whereas injection molding is a batch process), the rate at which the molten polymer compound is conveyed through the heating section is also the rate at which the material is passed through a die, which creates the desired two dimensional profile of the extruded component (step 706). As the extruded polymer compound exits the die, it cools and solidifies (step 708). For components having a large cross-sectional area, the extrusion rate must be decreased to allow the extruded polymer compound to cool and solidify. For components having a smaller cross-sectional area, the extrusion rate may be increased. By way of example, a 5" diameter cylindrical bar may be extruded at a rate of 8" per hour while a 2" diameter cylindrical bar may be extruded at a rate of 12" per hour. When a desired length of extruded polymer compound has been passed through the die and allowed to solidify, the extruded polymer compound is cut (step 710).

To create the finished component, the extruded polymer compound is then machined to its final shape (step 712). In one embodiment, machining an extruded component may include machining a ball 420 from a cylindrical bar. In another embodiment, machining an extruded component may include removing stock and/or cutting threads into a pipe-shaped extrusion. For example, mandrel may be formed as a pipe-shaped extrusion having a thick wall (e.g., having a wall thickness along its entire length that is equal to the wall thickness at the bottom of the mandrel) from which stock is removed to generate the ball seat and to incorporate threads for conveying the plug into a well.

The finished components generated by the injection molding process 600 or the extrusion process 700 may be annealed to increase the crystallinity of the polymer compound and to remove stresses and defects. The annealing process involves heating the finished component to between 300° F. and 400° F., holding the component at the elevated temperature for approximately 1-3 hours, and then allowing the component to be cooled to ambient temperature (approximately 70° F.). The finished components may be heated in an annealing oven or in a liquid heat transfer medium such as a heat transfer oil. Annealing has been observed to modify the degradation rates of finished components formed from polymer compounds.

As will be understood, extrusion process 700 may be preferred to injection molding process 600 for components that have a generally uniform cross-sectional profile due to its continuous nature (i.e., more components may be produced in a given amount of time via extrusion as opposed to injection molding). For example, mandrel, set ring, cones, and similarly-shaped components may all be good candidates for generation via the extrusion process 700. Likewise, ball 420 may be produced via the extrusion process 700. However, because the extrusion process 700 almost always requires the removal of some stock to generate the final components, there is some wasted material. Moreover, while the injection molding process 600 has been observed to generate a random orientation of reinforcing material (e.g., glass fibers) in the molded components, the extrusion process 700 results in reinforcing material orientations that are aligned with the extrusion direction or transverse to the extrusion direction depending upon the extrusion rate. Therefore, the beneficial effects of the random orientation of reinforcing material that are observed in injection molded components (i.e., strength in all loading directions) may not be observed in extruded components. However, because the extrusion process 700 can be controlled to cause reinforcing materials to be oriented in a desired orientation, the extrusion process may be ideally suited for producing components that are to be compressed in the extrusion direction or transverse to the extrusion direction.

As described herein, PVA compounds exhibit strength and degradability properties that render them well-suited for use in the formation of degradable downhole tools, tool components, and balls. The disclosed manufacturing processes can be utilized to form such tools, tool components, and balls in an almost unlimited number of shapes, sizes, and arrangements.

Raw PVA compounds may include 70-100 wt % PVA. More specifically, raw PVA compounds may include 70-75 wt %, 75-80 wt %, 80-85 wt %, 85-90 wt %, 90-95 wt %, or 95-100 wt % PVA. As described above, reinforcing materials may represent 5-60 wt % of a processed PVA compound, which may also include other fill materials and/or blend polymers. Processed PVA compounds used to create the tools, tool components, and balls described in the present application may include 20-95 wt % PVA. More specifically, processed PVA compounds may include 20-30 wt %, 30-40 wt %, 40-50 wt %, 50-60 wt %, 60-70 wt %, 70-80 wt %, 80-90 wt %, or 90-95 wt % PVA.

Above it has been described how to make components of the disclosed plugs (e.g., plugs 300 and/or 500). Specifically, the techniques described above may be used to make the mandrel, slips, sealing ring, and cones (if the embodiment includes cones). Techniques for making traditional drillable versions and degradable versions of those components have been described. Once those components are made it is necessary to install the elastomeric sealing element onto the plug. According to some embodiments, the components of the plug (i.e., mandrel, sealing ring, slips, and cones) are assembled and then the elastomeric sealing element can be molded onto the plug, such that the elastomeric sealing element encapsulates the slips and occupies the space between the slips (as shown in FIGS. 3-5). For example, the plug can be configured within a mold, such that the length of the plug from the bottom of the sealing ring to the top of the base section are maintained with in the mold. Then the sealing member material can be injected into the mold, such that it encapsulates the slips and fills the space between the slips. The techniques described above can be used for the injection molding process. Additional methods of in-situ manufacture include thermoset molding (ex: nitrile rubber); casting (ex: urethane, silicone) and 3-D printing. In addition to in-situ (injection molding, compression molding, casting and 3-D printing) application of the element to the plug, ex-situ methods include the forming of a "sheath" by injection molding, compression molding, casting, 3-D printing and extrusion, then stretching the "sheath" over the positions of the plug to be encapsulated.

Alternatively, the sealing member can be made as a sheath by injection molding or an extrusion process. The sheath can then be slid into its proper position on the assembled plug so that it encapsulates the slips and fills the space between the slips.

The foregoing disclosure and the showings made of the drawings are merely illustrative of the principles of this invention and are not to be interpreted in a limiting sense.

What is claimed is:

1. A tool for sealing in a tubing, the tool comprising:
   a mandrel having an axial bore extending therethrough, the mandrel being a single unitary piece and including a longitudinally extending tubular portion terminating at a base section, the base section having an enlarged outer diameter relative to an outer diameter of the tubular portion;
   a setting ring disposed on the mandrel;
   a top slip assembly disposed on the mandrel, the top slip assembly positioned adjacent to the setting ring;
   a cone disposed on the mandrel, the cone including an upper angled surface and a lower angled surface; the top slip assembly being in sliding engagement with the upper angled surface of the cone;
   a bottom slip assembly disposed on the mandrel, the bottom slip assembly being in sliding engagement with the lower angled surface of the cone; the bottom slip assembly positioned adjacent to the base section of the mandrel; and
   a monolithic elastomeric sealing member encapsulating the top slip assembly, the cone, and the bottom slip assembly.

2. The tool of claim 1, wherein the top slip assembly includes one or more teeth, the bottom slip assembly includes one or more teeth, or both the top slip assembly and the bottom slip assembly include one or more teeth.

3. The tool of claim 1, wherein the mandrel includes an inner bore wall defining the axial bore of the mandrel, the inner bore wall including a ball seat configured to receive a ball to plug the axial bore of the mandrel.

4. The tool of claim 1, wherein the elastomeric sealing element comprises a polyurethane material.

5. The tool of claim 1, wherein the elastomeric sealing element comprises one or more materials selected from the group consisting of polyvinyl alcohol (PVA), styrenic block copolymers (TPE-s), copolyesters (COPES), thermoplastic polyurethanes (TPU), polyamides (PEBA), thermoplastic polyolefinelastomers (TPE-o), polyolefin alloys (TPV), and thermoplastic olefinic elastomers (TPOs).

6. The tool of claim 5, wherein the elastomeric sealing element comprises PVA compounded with one or more of styrenic rubber, elastomeric nylon, ethylene-vinyl acetate (EVA), and foaming agents.

7. The tool of claim 1, wherein the mandrel, the top slip assembly, the cone, the bottom slip assembly, or any combination thereof comprises a degradable material.

8. The tool of claim 7, wherein the degradable material is a degradable metal.

9. The tool of claim 7, wherein the degradable material is a degradable polymer.

10. The tool of claim 7, wherein the degradable material is a degradable polymer blended with a degradable metal.

11. The tool of claim 1, wherein the tool has a run-in configuration and a set configuration; and wherein when the tool is placed in the set configuration, a sealing contact patch of the monolithic elastomeric sealing member extends from the setting ring to the base section of the mandrel.

12. A method of plugging a tubing comprising the steps of:
   a) running a tool down a tubing within a wellbore, the tool comprising: a mandrel having an axial bore extending therethrough, the mandrel being a single unitary piece and including a longitudinally extending tubular portion terminating at a base section, the base section having an enlarged outer diameter relative to an outer diameter of the tubular portion; a setting ring disposed on the mandrel; a top slip assembly disposed on the mandrel, the top slip assembly positioned adjacent to the setting ring; a cone disposed on the mandrel, the cone including an upper angled surface and a lower angled surface; the top slip assembly being in sliding engagement with the upper angled surface of the cone; a bottom slip assembly disposed on the mandrel, the bottom slip assembly being in sliding engagement with the lower angled surface of the cone; the bottom slip assembly positioned adjacent to the base section of the mandrel; and a monolithic elastomeric sealing member encapsulating the top slip assembly, the cone, and the bottom slip assembly; and
   b) applying a force to the tool to cause an actuation thereof, the actuation of the tool comprising moving the top slip assembly towards the bottom slip assembly, or moving the bottom slip assembly towards the top slip assembly, or moving the top slip assembly and the bottom slip assembly towards each other.

13. The method of claim 12, wherein the actuation of the tool further comprises a compression of the elastomeric sealing member between the top slip assembly and the bottom slip assembly causing the elastomeric sealing member to deform and form a sealing engagement with the tubing.

14. The method of claim 13, wherein the actuation of the tool further comprises an expansion of the top slip assembly and the bottom slip assembly to engage the tubing.

15. The method of claim 14, wherein each of the top slip assembly and the bottom slip assembly include teeth, and wherein the actuation of the tool comprises a puncture of the elastomeric sealing member by the teeth of the top slip assembly and by the teeth of the bottom slip assembly.

16. The method of claim 12, wherein the actuation of the tool comprises formation by the elastomeric sealing member of a contact patch with the tubing and wherein the contact patch extends from the setting ring to the base section of the mandrel.

* * * * *